United States Patent [19]

Baliozian

[11] Patent Number: 4,616,293
[45] Date of Patent: Oct. 7, 1986

[54] LIGHT-DIFFUSION BOX

[76] Inventor: Mardick Baliozian, 10 E. Ontario St., Chicago, Ill. 60610

[21] Appl. No.: 645,304

[22] Filed: Aug. 29, 1984

[51] Int. Cl.$^4$ .............................................. G03B 15/06
[52] U.S. Cl. ......................................... 362/7; 362/16; 362/18; 362/320; 362/352
[58] Field of Search ....................... 362/352, 7, 16, 18, 362/20, 320

[56] References Cited

U.S. PATENT DOCUMENTS

| | | | |
|---|---|---|---|
| 2,907,873 | 10/1959 | Smith | 362/320 |
| 4,052,607 | 10/1977 | Larson | 362/18 |
| 4,428,030 | 1/1984 | Baliozian | 362/352 |
| 4,446,506 | 5/1984 | Larson | 362/18 |
| 4,490,776 | 12/1984 | Kluch | 362/352 |

*Primary Examiner*—Ira S. Lazarus
*Attorney, Agent, or Firm*—August E. Roehrig, Jr.

[57] ABSTRACT

A light-diffusion box for illuminating a subject by means of a lamp placed within the box comprises in combination: a hollow rear casing having multiple facets and a reflecting internal face, the casing being constituted by a first sheet of opaque semi-rigid material provided with folding lines between the facets for collapsing the box to a flat state or for erecting the box in three dimensional form in readiness for use; a light-diffusing screen consisting of a translucent second sheet which is capable of assuming a flat shape; fasteners fitted respectively on the edges of the first sheet and on the edges of the second sheet; a central opening formed in the first sheet in order to place a light source in position within the diffusion box; folding lines which extend from the central opening to the periphery of the first sheet; a series of peripheral cut-outs formed in the first sheet with fastenable edges for converting the first sheet to a hollow casing; a polygonal contour at the periphery of the second sheet and corresponding in shape to the contour of the hollow casing formed by the first sheet.

7 Claims, 12 Drawing Figures

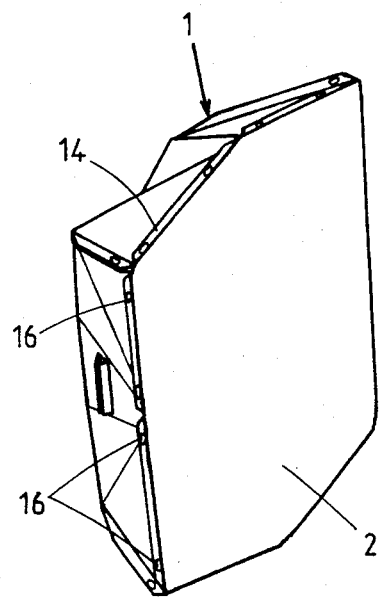
FIG_1
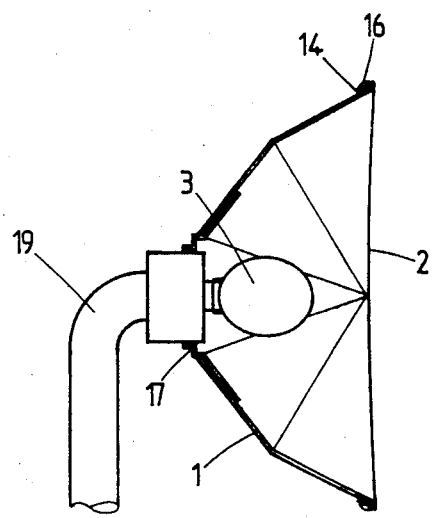
FIG_2
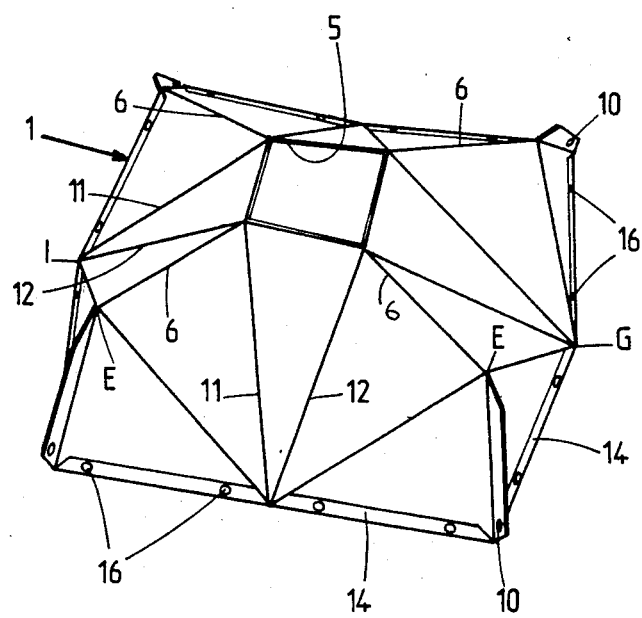
FIG_3

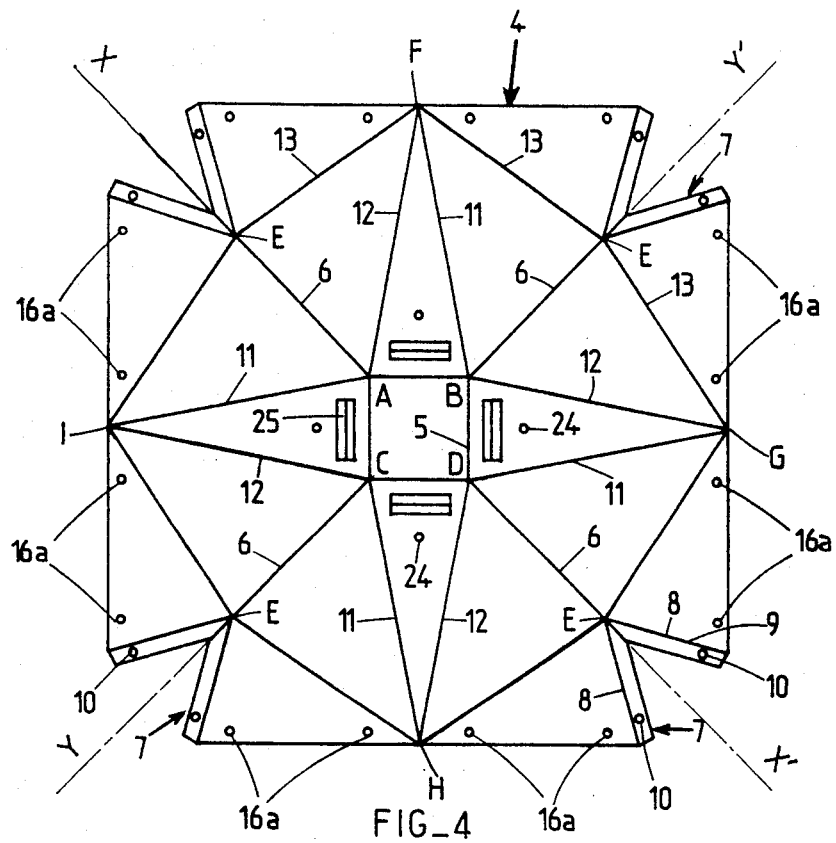

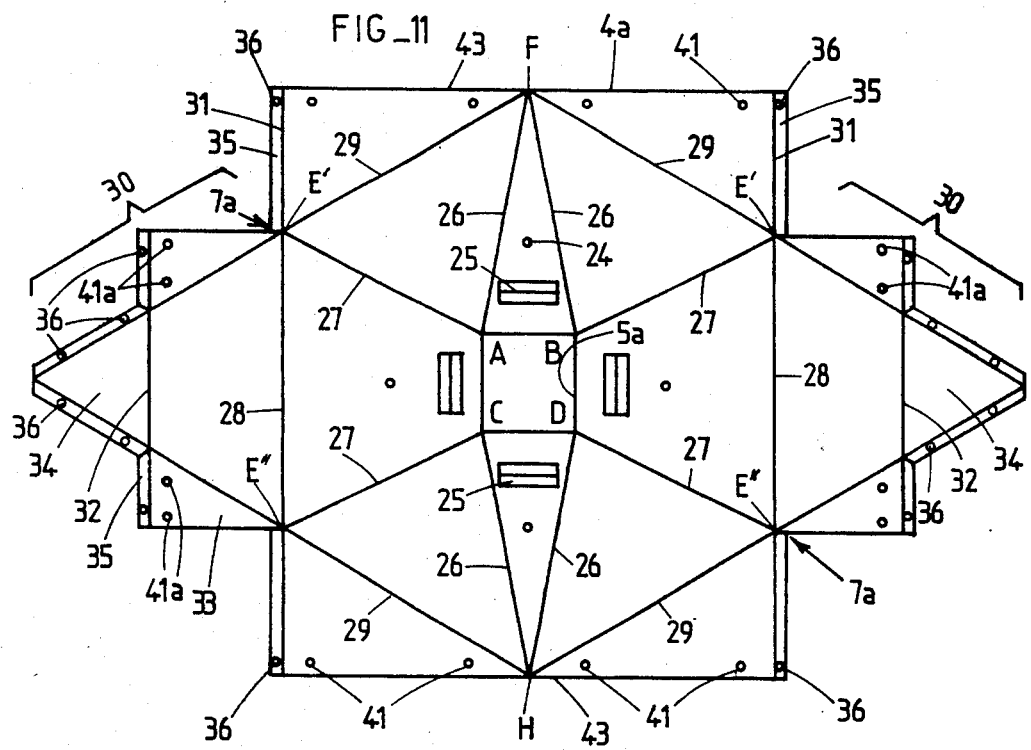

LIGHT-DIFFUSION BOX

BACKGROUND OF THE INVENTION

1. Field of the Invention

This invention relates to a device which is primarily of interest in the field of lighting for such applications as photography, television and video as well as general home and office use.

More pleasant and less harsh lighting effects are invariably obtained by employing light sources of large size rather than of small size. It is consequently a very common practice to employ light-diffusion boxes in order to convert the original small-size light source to one of larger size. The present invention offers an improved device for the achievement of this objective.

2. Description of the Prior Art

Many different types of light-diffusion boxes are already known and include the following:

(1) boxes which are made of light-reflecting material stretched out and held in shape by means of a metal framework. These light-diffusion boxes have an advantage in that they are completely collapsible and of very light weight. However, they are relatively high in capital cost by reason of the considerable labor involved in manufacture both of the fabric or plastic cover and of the metal parts. They also have an unattractive appearance and suffer from the limitations imposed by their basically pyramidal shape. They have no rigidity and the fabric cover is easily damaged by the metal parts. In addition, the light-transmitting face is always flat.

(2) Light-diffusion boxes made up of components similar to those mentioned in the foregoing paragraph but having a basically semi cylindrical shape are also well-known. However, they suffer from all of the same defects and always have a flat front face.

(3) Rigid non-collapsable light-diffusion boxes of various concave shapes which are fabricated from different plastics or aluminum alloys and are molded or shaped by various means. Tooling costs are thus very high. Although the boxes may be nested together for mass shipment, their volume and weight still remain exorbitantly high for individual shipment and costly packages of large size are necessary. These molded light-diffusion boxes are usually flat-faced. Although some types can be fitted with a molded three-dimensional front face, this face permanently retains its three-dimensional character. The interior of a diffusion box of this type is usually painted white or in a natural aluminum color but this is also a costly procedure and fails to achieve the desirable standard of efficiency.

(4) Another existing type of light-diffusion box essentially having a triangular or pylon shape with prismatic facets and thus provided with a three-dimensional light-emitting face as well as a three-dimensional rear portion. These boxes have the disadvantage in that the light source must either be incorporated in the box or else attached at one or both of its two open ends. Furthermore, if these diffusion boxes are provided with prismatic and opaque light-reflecting rear walls, they become very complicated to assemble and costly to manufacture by reason of the large number of parts to be made. A further disadvantage of a box of this type is that its light-transmitting face always remains three-dimensional. The reflection produced by a face having this shape may occasionally prove objectionable by reason of the fact that it is not rectangular. Since the shape of the light-diffusion box as a whole is usually oblong, it would often be useful to place it in any desired position between a vertical plane and a horizontal plane. However, this cannot be achieved simply by pivotal displacement of the box about its center since no provision is made for any pivotal support or central holding point. A further drawback is that it is necessary in the case of boxes of greater length to provide two light sources each mounted at one end in order to ensure uniform illumination over the entire length of the light-diffusion box.

(5) Prismatic three-dimensional front-faced light-diffusion boxes of existing types having a flat-faced and metallized opaque rear wall fabricated from a cut and embossed plastic sheet. These boxes have many advantages over the types mentioned above in paragraphs 1, 2 and 3. However, they suffer from the fact that their front face always remains in three-dimensional form, which incurs a certain loss of light along the axis illuminated by the box. At certain times, there may also be objectionable reflections from the non-rectangular front face of the box. In addition, the flat surface of the rear wall is attended by two further drawbacks. In the first place, this flat wall confers little strength and rigidity on the box. Secondly, homogeneous light-mixing is not achieved since the internal reflecting surface is flat.

SUMMARY OF THE INVENTION

The aim of the present invention is to produce a self supporting light-diffusion box needing no framework and which can readily be transported in a flat position, then mounted very rapidly and easily in its three dimensional form ready for use. However, the object of the invention is not only to provide a structure which is as simple as possible but also to permit any required conversions of the front translucent diffusing screen of the box thus formed, thus making it possible to modify its lighting characteristics.

Another aim of the present invention is to diffuse efficiently and homogeneously the light emitted by a light source placed within said box, which is made especially for the purpose of illuminating an object. To satisfy these aims, the invention concerns a light-diffusion box comprising in combination:

a hollow rear portion having multiple facets and a reflecting internal face, said rear portion being constituted by a first sheet of semi-rigid opaque material provided between the facets of said rear portion with folding lines for collapsing the box to its flat state or for erecting the box in three dimensional form ready for use;

a light-diffusing screen consisting of a translucent second sheet which is capable of assuming a flat shape;

assembling means provided respectively on the edges of the first sheet and on the edges of the second sheet;

a polygonal contour at the periphery of the first sheet, a central opening being formed in said first sheet in order to place a light source in position within the diffusion box;

folding lines which start from said central opening of the first sheet and terminate at the periphery of said sheet;

near the periphery of the first sheet, a series of cut-out portions increasing in width toward the periphery and having edges which are adapted to be joined together in order to convert said first sheet to a three dimensional shape so as to form the hollow rear portion of the light-diffusion box;

a polygonal contour at the periphery of the second sheet and corresponding in shape to the contour of the hollow casing formed by the first sheet when this latter is converted to its three dimensional shape in order to form said hollow casing.

In an advantageous embodiment of the light-diffusion box, the arrangement of the foldable sheet constituting the hollow rear portion of the box makes it possible to modify the shape of said rear portion whilst the diffusing screen is in turn arranged so as to permit conversion to different shapes desirable for different uses.

In a particular embodiment of the first sheet which is intended to constitute the hollow rear portion of the light-diffusion box, the central opening of the box has a polygonal contour and provision is made for a series of folding lines each starting from one of the corners of said opening and terminating at the starting point of one of the cut-out portions formed at the periphery. In addition, provision is made for a second series of folding lines which also start from the corners of the central opening in order to converge at an intermediate point of at least of some or all of the sides of the periphery.

BRIEF DESCRIPTION OF THE DRAWINGS

Other features of the invention will be more apparent upon consideration of the following description and accompanying drawings, wherein:

FIG. 1 is a view in perspective showing a first embodiment of a light-diffusion box in accordance with the invention;

FIG. 2 is a transverse sectional view of this diffusion box;

FIG. 3 is a bottom view in perspective showing the hollow rear portion of the box;

FIG. 4 is an overhead plan view of the grooved sheet which constitutes said hollow rear portion, said sheet being placed in a flat position in this case;

FIG. 5 is a sectional view of the complementary means for assembling the two portions of the diffusion box;

FIG. 6 is an overhead plan view of the light-source support which is fitted separately on the diffusion box in order to permit mounting of a light source within said box;

FIG. 7 is a top view in perspective and to a different scale showing another embodiment of the diffusion box in accordance with the invention;

FIG. 8 is a bottom view in perspective showing said diffusion box;

FIGS. 9 and 10 are views in perspective looking respectively on one side and on the end of the box;

FIG. 11 is an overhead plan view to a scale which is different from that of FIGS. 7 to 10 and shows the grooved flat sheet constituting the hollow rear portion of the diffusion box and placed in a flat position;

FIG. 12 is an overhead plan view to a scale which is different from that of the preceding figures and shows the grooved translucent sheet which constitutes the light-diffusing front face screen of the box.

DETAILED DESCRIPTION OF THE INVENTION

The box shown in FIGS. 1 to 4 is constituted by two complementary portions, namely a hollow rear portion 1 and a diffusing screen 2. These two portions are detachably assembled together and, after assembly, define an enclosure within which is placed a lamp 3 having the intended function of a light source.

The rear portion 1 of the light-diffusion box is formed by a sheet 4 whose periphery has a polygonal contour such as the square contour shown in the example of FIG. 4. Said sheet is provided with a polygonal central opening 5. Each side of said opening is located opposite one of the sides of the peripheral contour and parallel to this latter. Sheet 4 is provided with several series of grooves forming a corresponding number of folding lines which serve to convert this sheet to its three dimensional form, shown in FIGS. 1 to 3. To facilitate doing this, the sheet can be made of a "self-hinging", semi-rigid plastic material which is capable of practically unlimited folding along articulation lines formed by simple compression or grooves. The internal face of said sheet is provided with a reflecting coating.

The folding lines provided on said sheet comprise a series of four first lines 6 each extending from one of the corners A, B, C and D of opening 5 towards opposite corner of the peripheral contour of the sheet 4. However, each corner has a cut-out section 7 of which apex E is directed toward the interior. Consequently each folding line 6 terminates at the apex E of the corresponding notches. At least one edge of the two lateral sides of each cut-out portion 7 has a section 8 delimited by a folding line 9 which extends in a direction parallel to the corresponding edge. Sections 8 thus formed are fitted with connecting elements such as press-studs or snap-fasteners 10. Thus each cut-out portion 7 can be closed by means of the snap-fasteners thus putting sheet 4 in its three dimensional shape.

Two other folding lines 11 and 12 forming part of a series of second folding lines extend from each corner of central opening 5. Two successive folding lines 11 and 12 which are not separated by a first folding line 6 converge at points F, G, H, I located at the center of the opposite side of the polygonal contour of the sheet 4.

Finally, a third series of folding lines 13 each join the respective apices E of triangular notches 7 with the center points F, G, H or I on the adjacent sides of the polygonal contour of sheet 4.

As can be observed in FIG. 4, these three series of folding lines, in combination with the polygonal contour of sheet 4 and the sides of the cut-out portions 7 delimit a plurality of triangular facets. Thus sheet 4 can be converted into a three-dimensional hollow body 1 made up of a large number of facets which are inclined in different directions (twenty facets in the example shown in FIGS. 1 to 4). At the time of folding of said sheet in the form in which it is ready for use, the edges of cut-out portions 7 must be closed by joining together sections 8 of each.

The edges of the different sides of the peripheral contour of the sheet 4 are equipped with external fastening elements 16a which are used in conjunction with complementary elements 16 placed along sections 14 of diffusing screen 2 and delimited by folding lines 15. The elements thus provided can consist of a male portion 16 of a snap-fastener on sections 14 of the diffusing screen 2, in which case the female portion 16a, placed along the edges of sheet 4 (as shown in FIG. 5).

The diffusing screen consists of a sheet of translucent material. This sheet has a same polygonal shape as the contour formed by the peripheral edges of sheet 4 when this latter is ready for use as the hollow rear portion 1 of the light-diffusion box. Accordingly, it is only necessary to attach the edges of the diffusing front face onto the edges of the hollow rear portion in order to ensure that the latter is maintained in its ready to use position. The elements for joining the edges of the two components of the light-diffusion box need not necessarily consist of snap-fasteners or press-studs. They may also consist of resilient rivets, studs, screws or adhesive textile strips such as Velcro fasteners.

In conjunction with the diffusion box under consideration, provision is made for a removable device for mounting within the box a light source consisting of a lamp. As illustrated in FIG. 6, this device comprises a base plate 17 provided with a flange and having the same contour as the central opening 5 of the hollow rear portion 1 of the diffusion box. This plate is in turn provided with an opening 18 which advantageously has a circular contour, there being formed around said opening a means for fitting a socket or like support 19 for light source 3.

The mounting device aforesaid is also provided with sections 20, which can be either formed solidly with plate 17 or flaps pivotally attached to one or more sides of base plate 17 by means of hinges 21. These flaps are intended to fix the mounting device in position within opening 5 of the hollow rear portion 1 of the diffusion box in accordance with the invention. To do this, each flap is provided with a nut 22 for receiving a screw 23 which can be screwed into it after passing through holes 24 made for this purpose on a certain number of facets of the hollow rear portion 1 of the box.

The design concept of the mounting device described in the foregoing is such that the entire diffusion box can be rotated around the end portion 19 of the lamp support in order to place said box at any desired angular position with respect to the subject. Ventilation openings 25, formed in a certain number of facets of the hollow rear portion 1, permit ventilation of the internal space of the diffusion box while this latter is in use. These louver type openings are so arranged as to ensure that no light rays can escape directly to the exterior. Provision can in any case be made for light traps placed opposite to these openings.

As already stated in the foregoing, the box in accordance with the invention can be employed as a light box for illuminating an object or person to be photographed. By reason of the very large number of reflecting facets existing within the hollow rear portion 1, the light rays emitted by lamp 3 are dispersed in many different directions in a highly effective manner. Furthermore, a certain number of light rays thus undergo a series of successive reflections in different directions before passing through diffusing screen 2 and then proceeding toward the object to be illuminated. As a result of the mixing of these rays which are reflected inside the light box in different directions, very uniform lighting of the subject to be illuminated is thus obtained. This lighting is also relatively soft and without any sharp shadow or high contrast.

In its ready to use shape, the light-diffusion box has excellent rigidity even though it is fabricated solely from two sheets of relatively small thickness. This rigidity is essentially due to the presence of the multiple facets which make up the hollow rear portion 1 thanks to the numerous folding lines on corresponding sheet 4.

However, said diffusion box can be very easily and rapidly dismantled for transportation or storage while awaiting subsequent utilization. After removal of the lamp-mounting device, it is then only necessary to disassemble the diffusing screen by separating the fastening elements in order to restore sheet 4, to the flat state shown in FIG. 4.

In the case of this particular example, said sheet 4 can then be folded back along one of its diagonals X—X', then again along its second diagonal Y—Y'. It should further be noted that, in order to facilitate these two successive folding operations, folding lines 6 corresponding to these two diagonals can in practice be constituted by two parallel folding lines, the two lines of the first diagonal X—X' being closer together than those of the second diagonal. Under these conditions, the sheet 4 can be folded to a size corresponding to one-quarter of its total surface area. This makes it considerably easier to carry the box on location and also facilitates storage when not being used.

Diffusing screen 2 can be made of material which is sufficiently flexible to be rolled-up. However, the screen can also consist of a sheet having a higher degree of rigidity and provided with folding lines in order to fold-up the sheet for transportation.

FIGS. 7 to 12 illustrate another embodiment of the light-diffusion box in accordance with the invention. In this embodiment, the corresponding box is also made up of only two components, namely a hollow rear portion 1a and a diffusing screen 2a.

As in the preceding embodiment, the rear portion of the box is formed by a plastic sheet 4a provided with several series of folding lines. There is formed at the center of the sheet a polygonal opening 5a which may have a square contour, for example, whereas the periphery of the sheet has a contour designed to fit efficiently into a rectangular-shaped sheet.

Two series of folding lines designated respectively by the reference numerals 26 and 27 start from each corner A, B, C, D of the opening 5a. The two folding lines 26 which start from the corners A and B converge towards the mid-point F of that side of the periphery which is located opposite. The same applies to the two lines 26 which start from the corners C and D since they converge toward the mid-point H of that side of the periphery which is located opposite.

Lines 27 which start from the corners B and D diverge and terminate at two separate and distinct points E' and E" which correspond to the starting points of the corresponding cut-out sections 7a and are located on a transverse folding line 28. The same applies to the other two folding lines 27 which start from the corners A and C of central opening 5a and terminate at two separate and distinct points E' and E" of another transverse folding line 28 and which are the starting points of the corresponding notches 7a.

However, there exists a third series of folding lines 29. Each of these connects a mid-point F or H of the two opposite sides of the periphery to one of the two intermediate points of the adjacent transverse folding line 28 which correspond to the apices of the notches 7a, namely to one of the points E' or E".

Beyond each transverse folding line 28 is an extension 30, which has a rectangular portion 33 succeeded by a transverse folding line 32 and successive triangular-shaped portion 34.

The edges of the different extensions 30 and neighbouring edges 31 have portions 35 which are delimited by folding lines and adapted to carry fastening elements 36 so arranged as to permit at least two different modes of folding of the sheet 4a at the time of use. These two distinct modes are shown both in FIGS. 7 and 9, respectively in the left half and in the right half of each figure.

In both modes of folding, the sheet 4a constitutes the hollow rear portion 1a of the corresponding light-diffusion box. As in the previous embodiments, said hollow rear portion is provided with a large number of light reflecting facets oriented in different directions which consequently give the desired degree of mechanical rigidity and the desired degree of mixing up of the light rays.

As illustrated in FIG. 12, the diffusing screen 2a of the corresponding box is formed by a sheet of translucent material provided with a number of folding lines which subdivide the sheet into a series of distinct facets.

There is thus provided a transverse folding line 37 as well as a series of oblique lines 38. Each oblique line joins one end K or L of the transverse folding line 37 to the mid-point M or N of one of the ends of the screen 2a. The edges of the screen are provided with sections 39 which are delimited by folding lines and are adapted to carry fastening elements 40 which are capable of fastening with the corresponding elements 41 fitted on the edges 43 of the sheet 4a which constitutes the hollow rear portion of the diffusion box.

The fasteners 42 placed along the narrow sides M and N can be attached to fasteners 41a along line 32, should a flat-faced rectangular-shaped box be desired. Should a three dimensional front face be desired, then fasteners 42 are attached to fasteners 36 along edges 35. Thus the diffusing face 2a can be mounted on the hollow rear portion 1a of the box either in a substantially flat form as illustrated in the left half of FIG. 7 and FIG. 9 or on the contrary in a surface-relief form as illustrated in the right half of the same figures. Diffusing screen 2a can also have a similar shape in both halves of its surface.

It will be readily apparent that the shape given to the hollow rear portion 1a must be modified in consequence by closing the cut-out portions 7a in a different manner and by either raising or not raising the triangular extensions 34. This change of shape makes it possible to modify the conditions of lighting of the object to be illuminated.

In conjunction with the diffusion box thus formed, provision is made for a mounting device for a light source of the type shown by way of example in FIG. 6, holes 24 being placed on a certain number of facets of the sheet 4a. These facets can also have ventilation openings 25 as in the preceding embodiment.

However, the light box made in accordance with the invention is not limited solely to the two embodiments which have been described in the foregoing and which have been given simply by way of indication. It is in fact possible to contemplate many other forms of construction having the same basic characteristics. If so required, the hollow rear portion of the diffusion box can be formed by a plurality of plastic sheets arranged in succession and joined to each other, either in order to increase the general dimensions of the box unit as a whole or in order to close the ends of the hollow rear portion of the diffusion box. These sheets can then be permanently attached together or else assembled in a detachable manner. Thus in the case illustrated by way of example in FIG. 11, the continuous surface of the box 1a could be formed by joining together a number of first sheets provided with folding lines, viz:

a first sheet having a substantially rectangular contour delimited by the two folding lines 28 and the two perpendicular sides which extend between these lines 28, another series of separate and distinct first sheets forming the lateral extensions 30, these additional sheets being joined to the corresponding edges of the rectangular sheet by suitable fastening means which allow a possibility of articulation to remain along the folding lines 28 and 32.

Similarly, the diffusing screen can be constituted by a plurality of sheets placed in succession and joined to each other.

In the different embodiments described in the foregoing, the lighting box in accordance with the invention retains the same essential advantages, viz:

(a) simplicity of structure, since the box can be formed by only two components apart from the device for mounting the light source;

(b) ease of transportation of the lighting box by reason of the possibility of rapid disassembly and folding of its two constituent elements to the flat state;

(c) high rigidity of the box by reason of the large number of stiffening facets of the hollow rear portion of said box;

(d) lightness of weight of the box unit by reason of the materials adopted for its constituent elements;

(e) possibility of rotating the light box on the rear central device used for mounting the light source.

What is claimed is:

1. A box for diffusing the light emitted by a light source placed within said box, especially for the purpose of illuminating a subject, wherein said box comprises in combination:
    a hollow rear portion having multiple facets and a reflecting internal face, said rear portion being constituted by a first sheet of opaque material provided between the facets of said rear portion with folding lines for collapsing the box to its flat state of for erecting the box in its ready to use three dimensional form;
    a light-diffusing screen consisting of a second sheet made of translucent material which is capable of being erected on said first sheet of opaque material in a first configuration forming a flat planar diffusion surface or a second configuration forming a three dimensional diffusion surface;
    assembling means provided respectively on the edges of the first sheet and on the edges of the second sheet for erecting said second sheet in either said first or said second configurations;
    a polygonal contour at the periphery of the first sheet, a central opening being formed in said first sheet in order to place a light source within the diffusion box;
    folding lines which start from said central opening of the first sheet and terminate at the periphery of said sheet;
    near the periphery of the first sheet, a series of cut-out portions increasing in width toward the periphery and having edges which are adapted to be joined together in order to convert said first sheet into a three dimensional state so as to form the hollow rear portion of the light-diffusion box;
    a polygonal contour at the periphery of the second sheet and corresponding in shape to the contour of the hollow casing formed by the first sheet when this latter is converted to its three dimensional state in order to form said hollow casing.

2. A light-diffusion box according to claim 1, wherein the edges of the second sheet have sections which are articulated along folding lines extending in a direction parallel to said edges, said sections being fitted with means for fastening them to the edges of the first sheet.

3. A light-diffusion box according to claim 1, wherein the second sheet is provided with a first folding line which extends along one of its central axes, and with two groups of two other folding lines each extending from one end of said first folding line to the center of the adjacent side of the polygonal contour of the periphery of said second sheet.

4. A light-diffusion box according to claim 1, wherein it is provided for a device for mounting said light-diffusion box on a lamp support, said mounting device being constituted by a base plate having the same peripheral contour as the central opening of the first sheet of the diffusion box and being provided with an opening for receiving said lamp support, and by a plurality of fixed or pivotally flaps arranged at the periphery of said base plate, fastening means being fitted on said flaps and adapted to permit attachment of said mounting device to the hollow rear portion constituted by the first sheet of the diffusion box.

5. A box for diffusing the light emitted by a light source placed within said box especially for illuminating a subject, wherein said light-diffusion box comprises in combination:
 a hollow rear portion having multiple facets and a reflecting internal face, said hollow rear portion being constituted by a first sheet of opaque material with folding lines placed between the facets of said hollow rear portion to permit the diffusion box to be flat or to be put in three dimensional form in order to be used;
 a diffusing screen constituted by a second sheet made of translucent material which is capable of being folded flat or rolled up or being erected on said first sheet of opaque material in a first configuration forming a flat planar diffusion surface or a second configuration forming a three dimensional diffusion surface;
 assembling means provided respectively on the edges of the first sheet and on the edges of the second sheet for erecting said second sheet in either said first or said second configurations;
 the aforesaid first sheet provided with a periphery having a polygonal contour and provided at its center with an opening for positioning a light source within the diffusion box;
 folding lines extending from said central opening of the first sheet to the periphery of said sheet;
 extensions placed on the periphery of said first sheet and articulated on the periphery of said sheet by means of folding lines, spacings being provided between the aforesaid extensions and the adjacent edges of the periphery of said first sheet, the width of said spacing being progressively greater in the outward direction;
 the edges of said extensions and the edges of the periphery of said first sheet being so designed as to be joined together in order to convert said first sheet to a three dimensional state and thus forming the follow rear portion of the diffusion box.

6. A light-diffusion box according to claim 5, wherein the first sheet has a first series of folding lines extending from each of the corners of the central opening of said sheet to the starting point of the spacings existing between the aforesaid extensions, and two other series of folding lines which also extend from the apices of the central opening of said sheet and converge at two intermediary points of two opposite sides of the periphery.

7. A box for diffusing the light emitted by a light source placed within said box especially for illuminating a subject placed in front of it, wherein said light-diffusion box comprises in combination:
 a hollow rear portion having multiple facets and a reflecting internal face, said hollow rear portion being constituted by at least two first sheets of opaque material forming a continuous surface provided with folding lines between the facets of said hollow rear portion to permit the diffusion box to be in a flat state or to be erected in three dimensional shape in readiness for use;
 diffusing screen made of translucent material constituted by a second sheet which is also capable of being folded, rolled or in a flat state or being erected on said first sheets of opaque material in a first configuration forming a flat planar diffusion surface or a second configuration forming a three dimensional diffusion surface;
 assembling means provided respectively on the edges of the first sheets and on the edges of the second sheet for erecting said second sheet in either said first or said second configurations;
 an opening formed in said first sheets for placing a light source within the diffusion box;
 folding lines extending from said opening to the periphery of the continuous surface formed by joining the first sheets together;
 near the periphery of said continuous surface formed by joining the first sheets together, a series of cut-out portions which increase in width in the outward direction and the edges of which are adapted to be joined together so as to convert said surface to a three dimensional state and thus to form the hollow rear portion of the diffusion box;
 a polygonal contour at the periphery of said second sheet and corresponding in shape to the contour of the hollow casing formed by the first sheet when this latter is converted to a three dimensional state so as to form said hollow casing.

* * * * *

UNITED STATES PATENT AND TRADEMARK OFFICE
CERTIFICATE OF CORRECTION

PATENT NO. : 4,616,293
DATED : October 7, 1986
INVENTOR(S) : Mardick Baliozian

It is certified that error appears in the above—identified patent and that said Letters Patent is hereby corrected as shown below:

Claim 1, line 33, "of" should be --or--.

Claim 5, line 54, "spacing" should be --spacings--.

Claim 7, line 26, before "diffusing" insert --a--.

Signed and Sealed this

Thirteenth Day of January, 1987

Attest:

DONALD J. QUIGG

*Attesting Officer*  *Commissioner of Patents and Trademarks*